United States Patent
Huck

(10) Patent No.: US 7,789,603 B2
(45) Date of Patent: Sep. 7, 2010

(54) RETRACTABLE TIE DOWN DEVICE

(75) Inventor: Jeffrey D. Huck, Fortville, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 12/176,045

(22) Filed: Jul. 18, 2008

(65) Prior Publication Data

US 2009/0047091 A1    Feb. 19, 2009

Related U.S. Application Data

(60) Provisional application No. 60/951,062, filed on Jul. 20, 2007.

(51) Int. Cl.
*B61D 45/00* (2006.01)

(52) U.S. Cl. ..................................... 410/100

(58) Field of Classification Search ................ 410/100, 410/103, 97, 10–12, 21, 23; 248/499; 254/217, 254/223, 243, 245, 247, 330, 345, 352, 355–357, 254/365, 369, 376
See application file for complete search history.

(56) References Cited

U.S. PATENT DOCUMENTS

| | | | | |
|---|---|---|---|---|
| 5,282,706 A | * | 2/1994 | Anthony et al. | ............. 410/100 |
| 5,369,848 A | | 12/1994 | Huang | |
| 5,560,086 A | * | 10/1996 | Huang | ..................... 24/68 CD |
| 5,774,915 A | | 7/1998 | Scott et al. | |
| 5,778,496 A | | 7/1998 | Huang | |
| 5,819,377 A | | 10/1998 | Huang | |
| 5,894,638 A | | 4/1999 | Huang | |
| 5,943,742 A | | 8/1999 | Huang | |
| 6,007,053 A | * | 12/1999 | Huang | ........................ 254/247 |
| 6,139,234 A | * | 10/2000 | Huang | ........................ 410/103 |
| 6,457,701 B1 | * | 10/2002 | Huang | ........................ 254/217 |
| 6,524,041 B1 | * | 2/2003 | Voiculescu | .................. 410/100 |
| 6,609,275 B1 | | 8/2003 | Lin | |
| 6,641,116 B1 | | 11/2003 | Huang | |
| 7,107,655 B1 | | 9/2006 | Huang | |
| 7,350,767 B2 | | 4/2008 | Huang | |

(Continued)

OTHER PUBLICATIONS

Set of Engineering drawings for a CargoBuckle designed and manufactured by the Assignee of the subject application, ranging in dates from Mar. 15, 1990 through Jan. 15, 2007 (19 pages).

(Continued)

*Primary Examiner*—H. Gutman
(74) *Attorney, Agent, or Firm*—Barnes & Thornburg LLP

(57) ABSTRACT

A retractable tie down device may comprise a frame, a spool including a ratchet wheel rotatably mounted to the frame, a flexible web having one end mounted to the spool, a power spring configured to rotate the spool in a web take-up direction, a handle movably mounted to the frame, a ratchet pawl movably mounted to the handle and biased toward the ratchet wheel, and a lock pawl movably mounted to the frame and biased toward the ratchet wheel. The handle may be configured to move the lock pawl away from the ratchet wheel, and the frame may be configured to maintain the ratchet pawl away from the ratchet wheel, when the handle is in a position adjacent to the frame so that the spool is rotatable in a web pay-out direction.

28 Claims, 14 Drawing Sheets

U.S. PATENT DOCUMENTS

| | | | |
|---|---|---|---|
| 7,412,754 B2* | 8/2008 | Hanson | 24/68 CD |
| 7,503,736 B1* | 3/2009 | Chen | 410/100 |
| 2004/0084558 A1 | 5/2004 | Huang | |
| 2004/0094650 A1 | 5/2004 | Huang | |
| 2006/0197071 A1 | 9/2006 | Huang | |

OTHER PUBLICATIONS

Catalog (undated) containing the CargoBuckle noted above (2 pages).

* cited by examiner

RETRACTABLE TIE DOWN DEVICE

CROSS REFERENCE TO RELATED APPLICATIONS

This patent application claims priority to and the benefit of U.S. Provisional Patent Application Ser. No. 60/951,062, filed Jul. 20, 2007, the disclosure of which is incorporated herein by reference.

FIELD OF THE INVENTION

The present invention relates generally to restraint devices, and more specifically to retractable tie down devices.

BACKGROUND

Retractable tie down arrangements are generally known. Among other uses, such arrangements are sometimes used to secure cargo to motor vehicles. It is desirable to provide improved retractable tie down devices.

SUMMARY

The present invention may comprise one or more of the features recited in the attached claims, and/or one or more of the following features and combinations thereof. A retractable tie down device may comprise a frame, a spool rotatably mounted to the frame, a flexible web having one end mounted to the spool, a power spring configured to rotate the spool in a web take-up direction, a handle movably mounted to the frame and movable relative to the frame between first and second positions, a ratchet pawl movably mounted to the handle and biased toward the at least one ratchet wheel, and a lock pawl movably mounted to the frame. The spool may have at least one ratchet wheel mounted thereto. The handle may have a handle grip that extends upwardly away from the frame when the handle is in the first position and that is adjacent to the frame when the handle is in the second position. The lock pawl may be biased relative to the frame toward the at least one ratchet wheel. The handle may be configured to move the lock pawl away from the at least one ratchet wheel, and the frame may be configured to maintain the ratchet pawl away from the at least one ratchet wheel, when the handle is in the second position so that the spool is rotatable in a web pay-out direction, opposite to the web take-up direction, whereby the web may be drawn away from the device.

The retractable tie down device may further comprise a ratchet pawl spring positioned between the ratchet pawl and the handle grip. The ratchet pawl spring may be configured to bias the ratchet pawl away from the handle grip and toward the at least one ratchet wheel. The ratchet pawl may be manually moved toward the handle grip against the bias of the ratchet pawl spring in order to move the handle to the second position.

The handle may be configured to move the lock pawl away from the at least one ratchet wheel, and the frame may be configured to maintain the ratchet pawl away from the at least one ratchet wheel, when the handle is in the first position so that the spool is rotatable in a web pay-out direction. The frame may define a channel configured to receive the ratchet pawl therein when the handle is in the first position so that the handle is secured to the frame in the first position. The retractable tie down device may further comprise a ratchet pawl spring positioned between the ratchet pawl and the handle. The ratchet pawl may be received within the channel under a bias of the ratchet pawl spring.

The handle may define third and fourth positions, between the first and second positions, relative to the frame, and the handle may be movable between the third and fourth positions to ratchet the spool in the web take-up direction. The ratchet pawl and the lock pawl may both contact the at least one ratchet wheel throughout movement of the handle between the third and fourth positions. The at least one ratchet wheel may define a plurality of teeth thereon oriented to allow movement of the ratchet pawl relative to the at least one ratchet wheel, while engaging the lock pawl such that the lock pawl locks the at least one ratchet wheel to the frame, when the handle is moved from the third to the fourth position, and to engage the ratchet pawl, while allowing the lock pawl to move relative to the at least one ratchet wheel, when the handle is moved from the fourth to the third position, whereby the spool is ratcheted in the web take-up direction by moving the handle between the third and fourth positions. The retractable tie down device may further comprise a ratchet pawl spring positioned between the ratchet pawl and the handle. The ratchet pawl spring may be configured to bias the ratchet pawl against the at least one ratchet wheel throughout movement of the handle between the third and fourth positions. A lock pawl spring may be configured to bias the lock pawl against the at least one ratchet wheel throughout movement of the handle between the third and fourth positions. The handle may define a fifth position, between the first and second positions, relative to the frame. The frame may define a channel configured to receive the ratchet pawl therein when the handle is in the fifth position such that the handle is secured to the frame. The ratchet pawl and the lock pawl may both engage the at least one ratchet wheel when the handle is in the fifth position so that the spool is locked to the frame when the handle is in the fifth position. The retractable tie down device may further comprise a ratchet pawl spring positioned between the ratchet pawl and the handle grip. The ratchet pawl may be received within the channel under a bias of the ratchet pawl spring. The ratchet pawl may be manually moved toward the handle grip against the bias of the ratchet pawl spring such that the ratchet pawl is drawn out of the channel in order to move the handle from the fifth position to any of the first, second, third and fourth positions. The handle may be movable under manual force applied thereto to the second position from any of the first, third, fourth and fifth positions. The handle may automatically move from the second to the fifth position when the manual force is removed from the handle with the handle in the second position. The at least one ratchet wheel may define a plurality of teeth thereon oriented to engage the ratchet pawl and the lock pawl when the handle is in the fifth position.

The retractable tie down device may further comprise a cup mounted to the frame, and a lock pawl spring positioned within the cup. The lock pawl may have one end extending at least partially into the cup and attached therein to one end of the lock pawl spring with an opposite end of the lock pawl spring attached to the frame. The lock pawl spring may bias the lock pawl toward the at least one ratchet wheel. The power spring may also be positioned within the cup. The cup may be configured such that the lock pawl spring and the power spring are not accessible external to the cup when the cup is mounted to the frame.

The frame may define a first end and a second end opposite to the first end. The spool may be oriented relative to the frame such that the flexible web pays out of the first end of the frame. The frame may define a hole through the frame between the first and second ends. The hole may be configured to receive a mounting post whereby the device is mounted to the mounting post. Alternatively or additionally, the frame may define a web slot through the frame adjacent to the second end of the frame. The retractable tie down device may further comprise another flexible web extending away from the second end of the frame and having one end attached to the frame via the web slot. An engagement member may be attached to an opposite end of the another flexible web. Alternatively or additionally, another engagement member may be attached to an opposite end of the flexible web.

The handle may define a third position, between the first and second positions, relative to the frame. The frame may define a channel configured to receive the ratchet pawl therein when the handle is in the third position such that the handle is secured to the frame. The ratchet pawl and the lock pawl may both engage the at least one ratchet wheel when the handle is in the third position so that the spool is locked to the frame when the handle is in the third position. The handle may be movable under manual force applied thereto to the second position from either of the first and third positions. The handle may automatically move from the second to the third position when the manual force is removed from the handle with the handle in the second position. The retractable tie down device may further comprise a ratchet pawl spring positioned between the ratchet pawl and the handle grip. The ratchet pawl may be received within the channel under a bias of the ratchet pawl spring. The ratchet pawl may be manually moved toward the handle grip against the bias of the ratchet pawl spring such that the ratchet pawl is drawn out of the channel in order to move the handle from the third position to either of the first and second positions. The at least one ratchet wheel may define a plurality of teeth thereon oriented to engage the ratchet pawl and the lock pawl when the handle is in the third position.

A retractable tie down device may comprise a frame, a spool rotatably mounted to the frame, a flexible web having one end mounted to the spool, a handle movably mounted to the frame and movable relative to the frame between first and second positions to ratchet the spool in a web take-up direction, a lock pawl movably mounted to the frame, a cup mounted to the frame, and a lock pawl spring positioned within the cup. The spool may have at least one ratchet wheel mounted thereto. The lock pawl may have one end extending at least partially into the cup and attached therein to one end of the lock pawl spring with an opposite end of the lock pawl spring attached to the frame. The lock pawl spring may bias the lock pawl toward the at least one ratchet wheel.

The cup may be configured such that the lock pawl spring is not accessible external to the cup when the cup is mounted to the frame.

The frame may comprise first and second upstanding walls with the spool and the lock pawl extending between opposing interior sides of the first and second walls. The cup may be mounted to an exterior side of one of the first and second walls. The one end of the lock pawl may extend through the one of the first and second walls and at least partially into the cup.

The retractable tie down device may further comprise a power spring configured to rotate the spool in a web take-up direction. The power spring may also be positioned within the cup, and the cup may be configured such that the lock pawl spring and the power spring are not accessible external to the cup when the cup is mounted to the frame. The retractable tie down device may further comprise a pin configured to extend through the frame and the spool. The pin may be configured to rotate relative to the frame and to engage the spool such that the spool rotates with the pin relative to the frame. The pin may have one end configured to extend into the cup and mount to one end of the power spring with an opposite end of the power spring configured to be attached to the cup.

A retractable tie down device may comprise a frame having a first end and a second end opposite the first end. The frame may define a web slot through the frame adjacent to the second end of the frame. The web slot may be configured to attach a first flexible web thereto such that the first web extends away from the second end of the frame. A spool may be rotatably mounted to the frame between the first and second ends of the frame. A second flexible web may have one end mounted to the spool with the spool oriented relative to the frame such that the flexible web pays out of the first end of the frame. A handle may be movably mounted to the frame and movable relative to the frame between first and second positions to ratchet the spool in a web take-up direction.

The spool may have at least one ratchet wheel mounted thereto. The retractable tie down device may further comprise a ratchet pawl mounted to the handle and configured to contact the at least one ratchet wheel throughout movement of the handle between the first and second positions. The ratchet pawl may be configured to engage the ratchet wheel and ratchet the spool in the web take-up direction when the handle is moved between the first and second positions.

The retractable tie down device may further comprise the first flexible web having one end attached to the frame via the web slot.

The frame may define a hole through the frame between the first and second ends. The hole may be configured to receive a mounting post whereby the device is mounted to the mounting post.

The retractable tie down device may further comprise an engagement member attached to an opposite end of the first flexible web.

The retractable tie down device may further comprise an engagement member attached to an opposite end of the second flexible web.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
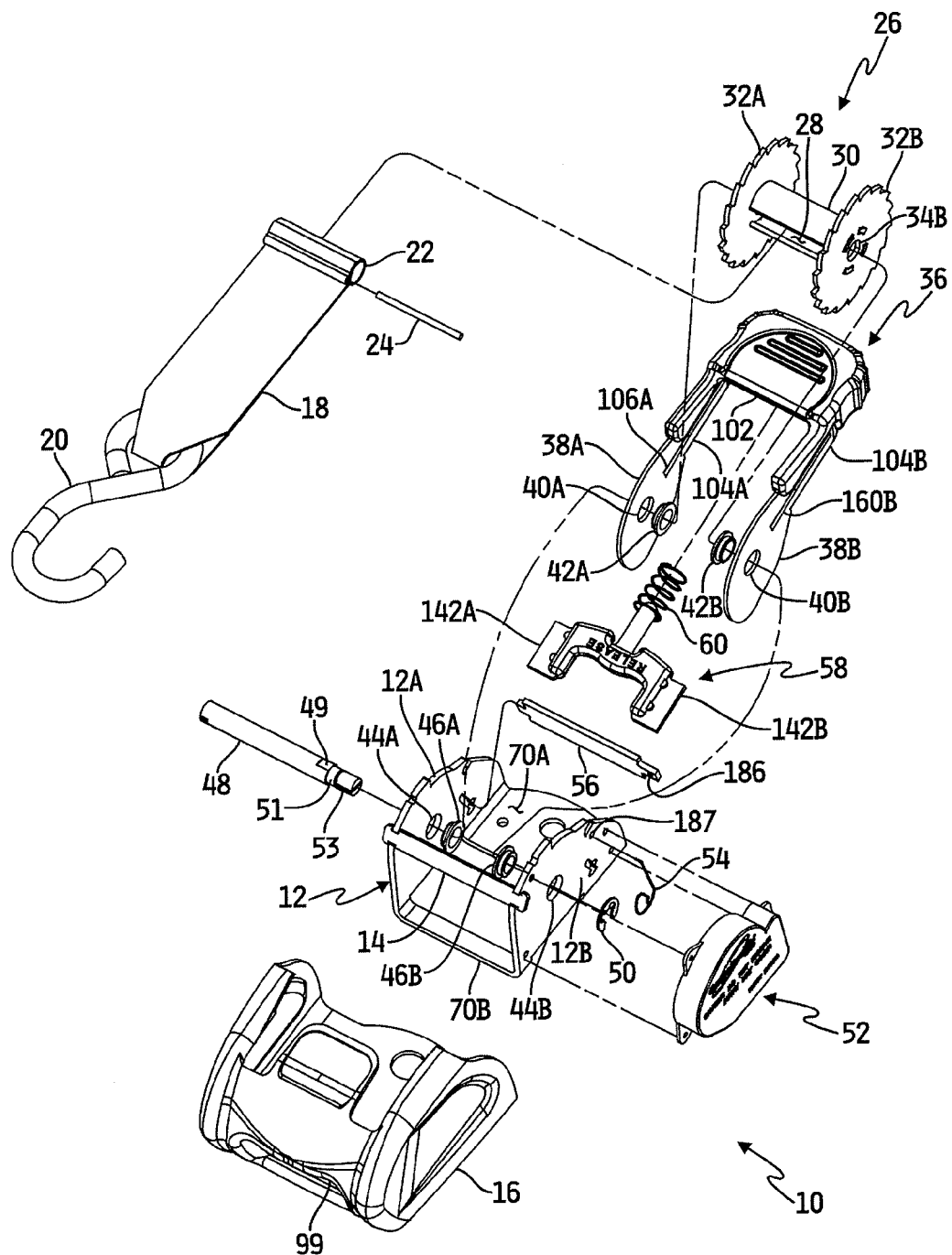
FIG. 1 is an assembly view of one illustrative embodiment of a retractable tie down device.

Referring now to FIG. 1, an assembly view of one illustrative embodiment of a retractable tie down device 10 is shown. In the illustrated embodiment, the device 10 includes a frame 12 that is configured to be received within a frame boot 16. Further details relating to one illustrative embodiment of the frame 12 and the frame boot 16 will be described hereinafter with respect to FIGS. 2A-2D. The device 10 further includes a flexible web 18 that is attached at one end to an engagement member 20. The web 18 may be provided in the form of a conventional woven fabric, although the web 18 may alternately be provided in the form of any conventional, flexible tether, strap, belt or the like. In the illustrated embodiment, the engagement member 20 is provided in the form of a hook, although it will be understood that the engagement member 20 may alternatively be any conventional engagement member including, but not limited to, a bracket, a conventional buckle, a conventional tongue, post, carabineer, or other conventional member configured to engage another member or structure. In other embodiments, the engagement member 20 may be omitted, and the end of the flexible web 18 may instead engage a conventional web engaging member. The opposite end of the flexible web 18 is formed in a loop 22 and secured in the configuration by a web pin 24 in a conventional manner.

A spool assembly 26 comprises a spool member 30 defining a longitudinal slot 28 therethrough, which is sized to receive the loop 22 formed at the end of the flexible web 18. In the illustrated embodiment, the spool assembly 26 includes a pair of ratchet wheels 32A and 32B, with one ratchet wheel 32A mounted to one end of the spool 30 and the other ratchet wheel 32B mounted to an opposite end of the spool 30. Although FIG. 1 illustrates the spool assembly 26 as having two such ratchet wheels 32A and 32B, embodiments having more or fewer such ratchet wheels are contemplated by this disclosure. In the illustrated embodiment, the spool assembly 26 is manufactured from separate components, and the ratchet wheels 32A and 32B are mounted to opposite ends of the spool 30. This disclosure contemplates other embodiments of the spool assembly 26 in which the spool 30 and the one or more ratchet wheels 32A and 32B are formed as a unitary structure, and in any case the slot 28 is sized such that the loop 22 of the web 18 may extend therein such that the web loop 22 is retained within the spool 30. Each of the ratchet wheels 32A and 32B define a hole 34A and 34B therethrough (only hole 34B is shown in FIG. 1) that aligns with a bore extending through the web loop 22.

The retractable tie down device 10 further includes a handle assembly 36 having a pair of sides 104A and 104B that are joined together at one end by a handle grip 102. The opposite ends of the sides 104A and 104B define handle lobes 38A and 38B respectively, and the lobes 38A and 38B each define a respective bore 40A and 40B therethrough. A bushing 42A is configured to be received within the bore 40A, and another bushing 42B is configured to be received within the bore 40B.

The frame 12 has a pair of upstanding sidewalls 12A and 12B that are joined together at one end by a pair of framed bases 70A and 70B. The framed sidewall 12A defines a bore 44A therethrough, and the frame sidewall 12B defines a bore 44B therethrough. A bushing 46A is configured to be received within the bore 44A and a bushing 46B is configured to be received within the bore 44B.

A device axle or pin 48 is configured to be received by the frame 12, the web loop 22, the spool assembly 26 and the handle assembly 36, as shown by dashed-line representation in FIG. 1, to assemble the components of the device 10 just described. In particular, one end of the pin or axle 48 extends through, in sequence, the bore 44A, the bushing 46A, the bore 40A, the bushing 42A, the bore defined in the ratchet wheel 32A, the spool 30, the web loop 22, the bore 34B defined through the ratchet wheel 32B, the bushing 42B, the bore 40B, the bushing 46B, and the bore 44B of the frame 12. A clip or retainer 50 is configured to engage the end of the pin or axle 48 to prevent longitudinal movement of the pin or axle 48 relative to the frame 12 and other associated components. A tie bar 14 is mounted between the upstanding sidewalls 12A and 12B of the frame 12 near the open top of the frame 12 to provide stability to the sidewalls 12A and 12B.

Assembled as just described, the handle assembly 36 is rotatably mounted to the frame 12, and the spool assembly 26 is likewise rotatably mounted to the frame. The axle or pin 48 defines a profile 49, e.g., a flat surface, near one end thereof, and the bore 34B of the ratchet wheel 32B defines a complimentary profile so that the axle or pin 48 engages the ratchet wheel 32B such that the entire spool assembly 26 rotates with the pin or axle 48. The area 51 defined between the profile 49 and the end of the pin or axle 48 is sized and/or configured to lockingly receive the clip or collar 50. The end of the pin or axle 48 defines a slot 53 therein for the purpose of engaging a power spring positioned within a spring cup 52 that is mounted to the external side of the sidewall 12B.

A lock pawl 56 is movably mounted to the frame 12 between the sidewalls 12A and 12B thereof. One of the ends of the lock pawl 56 defines a bore 186 therethrough that is sized to receive one end of a lock pawl spring 54. The lock pawl spring 54 is also received and contained within the spring cup 52 that is mounted to the external side of the sidewall 12B. The sidewall 12A of the frame defines a bore 187 therethrough that is sized to receive the opposite end of the lock pawl spring 54. A ratchet pawl assembly 58 is configured to receive a spring 60 as shown in FIG. 1, and the ratchet pawl 58 and spring 60 combination is movably mounted to the handle assembly 36 as will be described in detail hereinafter.

Referring now to FIGS. 2A-2D, various views of the frame 12 and frame boot 16 are shown. As described above, the frame 12 includes a pair of upstanding sidewalls 12A and 12B joined at one end of the bottom of each sidewall 12A, 12B by a base 70A and at an opposite end of the bottom of each sidewall 12A, 12B by another base 70B. The top edges of the upstanding sidewalls 12A and 12B are identically configured, and each defines a slot 72A, 72B configured to receive the tie bar 14 (see FIG. 1) generally above the base 70B. Forward of the slot 72A, 72B, the sidewalls 12A and 12B define a channel 78A, 78B respectively followed by a substantially planar edge 76A, 76B which terminates at a substantially vertical edge 78A, 78B. Forward of the substantially vertical edge 74A, 74B, the sidewalls 12A and 12B define a curved region 80A, 80B which terminates at another channel 84A, 84B. Forward of the channel 84A, 84B, the sidewalls 12A and 12B define another curved region 86A, 86B that slopes downwardly to the base 70A.

The sides 12A and 12B further define bores 88A, 88B respectively therethrough. The side 12A further defines a channel 90A therethrough in communication with the bore 88A, and the side 12B defines a channel 90B therethrough in communication with the bore 88B. The bores 88A and 88B are configured to receive opposite ends of the lock pawl 56 (see FIG. 1) therethrough, and the slots 90A and 90B are provided to guide the opposite ends of the lock pawl 56 into the bores 88A and 88B, during manufacturing of the retractable tie down device 10. The lock pawl 56 is movably mounted to the base 12 between the sidewalls 12A and 12B and within the bores 88A and 88B, and the bores 88A and 88B are configured to allow axial movement, e.g., axial pivoting, of the lock pawl 56 relative to the frame 12. The top profile of the sidewalls 12A and 12B, as just described, define a number of different positions and/or regions of the handle assembly 36 and/or of operation of the handle assembly 36, relative to the frame 12 as will be described in greater detail hereinafter.

Figure 2A:
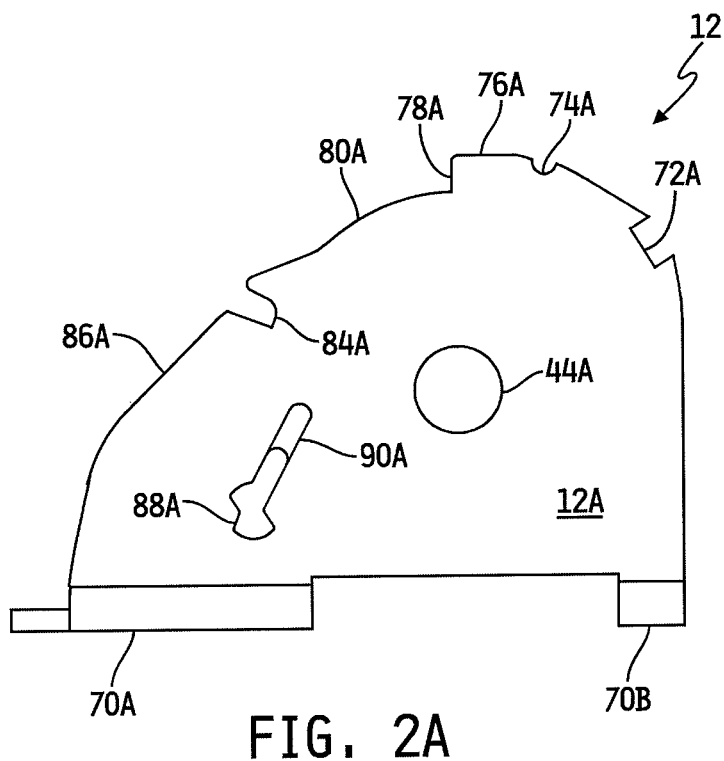
FIG. 2A is a side elevational view of one side of the frame of the retractable tie down device of FIG. 1.
Figure 2B:
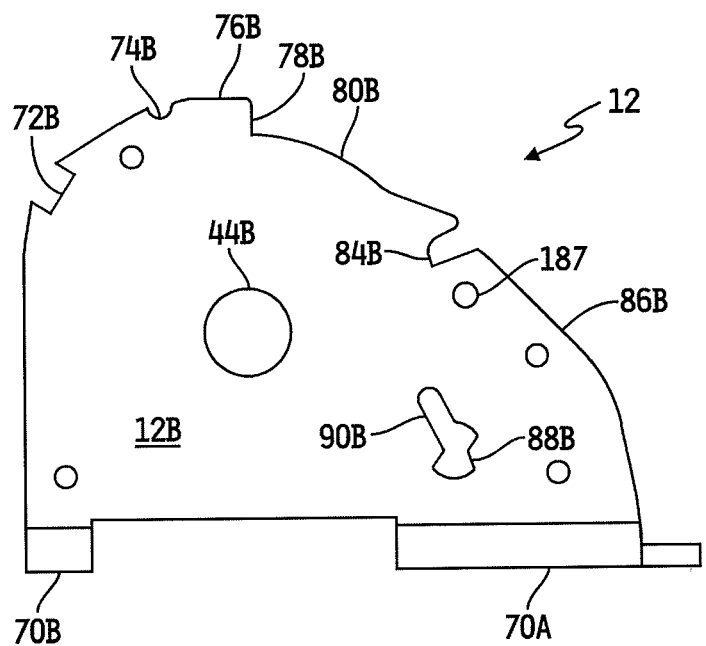
FIG. 2B is a side elevational view of the opposite side of the frame of the retractable tie down device of FIG. 1.
Figure 2C:
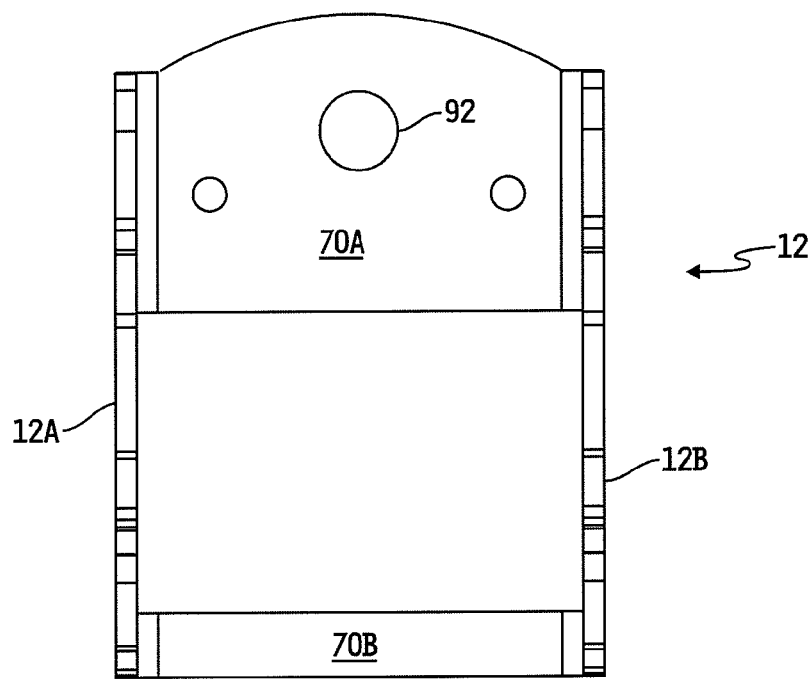
FIG. 2C is a top plan view of the frame of the retractable tie down device of FIG. 1.

Referring now specifically to FIG. 2C, the base portion 70A of the frame 12 defines a hole 92 therethrough which is configured to receive a mounting post or other protrusion therethrough for mounting the frame 12 to a support surface. In the illustrated embodiment, the hole 92 has an "O" shaped profile, although it will be understood that this profile is provided only for illustrative purposes, and that the hole 92 may alternatively have other profiles. The base region 70B is provided at an opposite end of the frame 12 for stability, and the region defined between the base portions 70A and 70B is, in the illustrated embodiment, open.

Figure 2D:
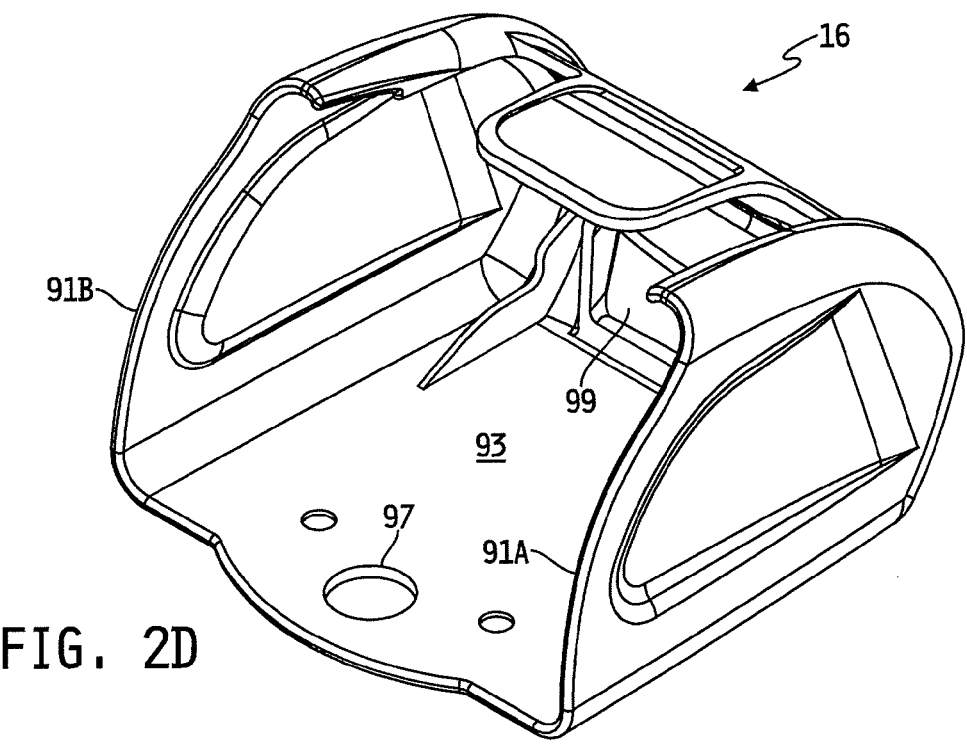
FIG. 2D is a perspective view of the frame boot of the retractable tie down device of FIG. 1.

Referring now to FIG. 2D, one illustrative embodiment of the frame boot 16 is shown. The frame boot 16 defines a base portion 93 and a pair of upstanding sidewalls 91A and 91B extending away from the base portion 93. The base portion 93 and sidewalls 91A, 91B are sized and configured to be received over corresponding components of the frame 12, and the base portion 93 further defines a hole 97 therethrough which, when the boot 16 is received over the frame 12, is aligned with the hole 92 of the base portion 70A of the frame 12 (see FIG. 2C). The frame boot 16 further defines a slot 99 through which the web 18 passes.

Referring now to FIGS. 3A-3E, various details of the handle assembly 36 are illustrated. Generally, the handle assembly 36 comprises a handle 100 and a handle grip boot 130. A ratchet pawl assembly 58 is movably mounted to the handle assembly 36 and details relating to the ratchet pawl assembly 58 will be illustrated and described hereinafter with respect to FIGS. 4A-4B.

Figure 3A:
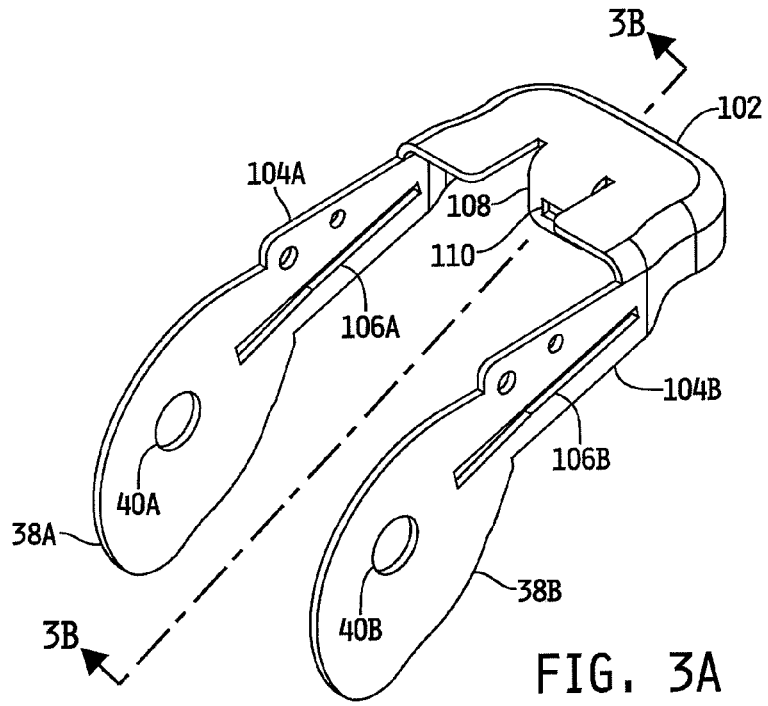
FIG. 3A is a perspective view of the handle of the retractable tie down device of FIG. 1.
Figure 3B:
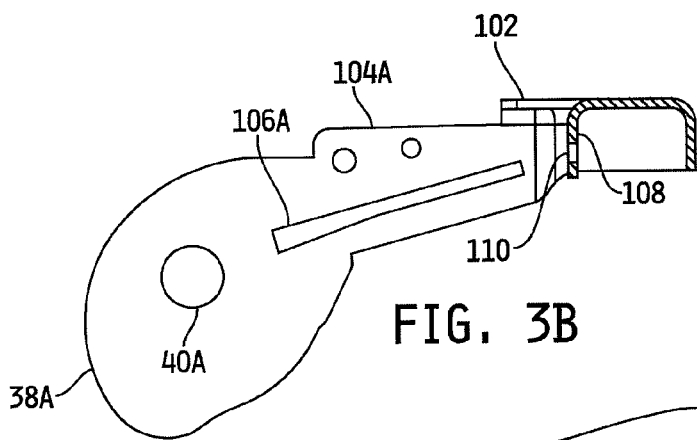
FIG. 3B is a cross-sectional view of the handle of FIG. 3A viewed along section lines 3B-3B.
Figure 3C:
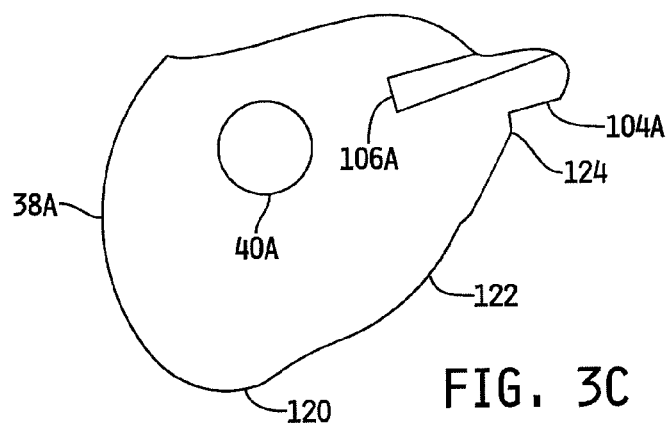
FIG. 3C is a magnified view of one of the lobe portions of the handle of FIGS. 3A and 3B.
Figure 3D:
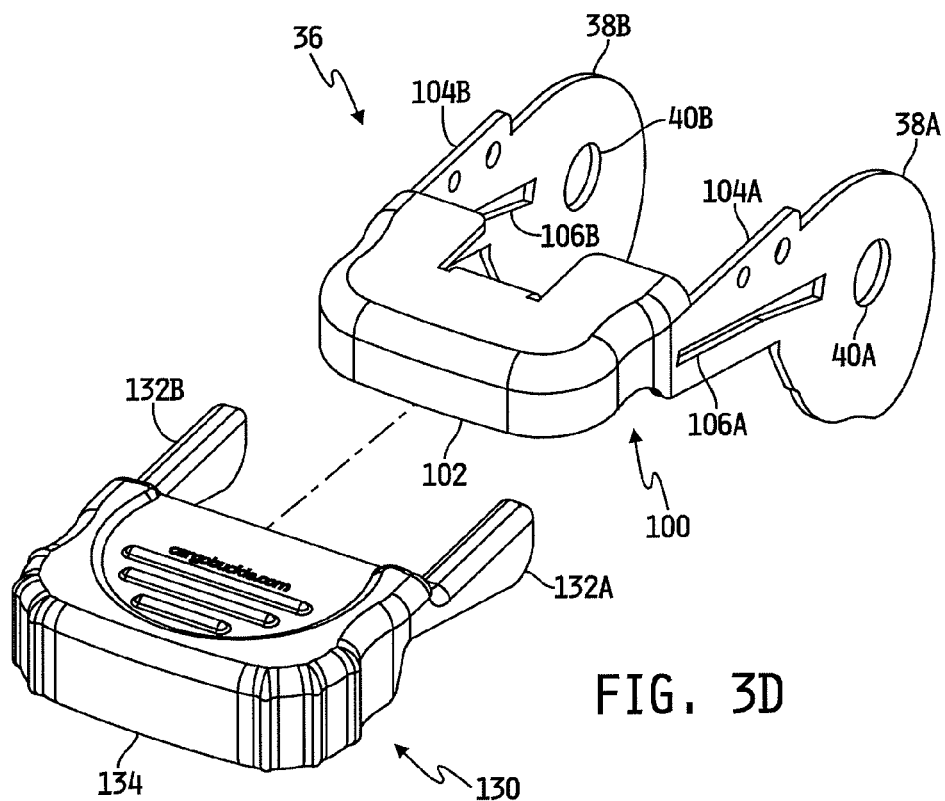
FIG. 3D is an assembly view of the handle assembly of the retractable tie down device of FIG. 1.

The handle 100 includes a pair of arms 104A and 104B that are joined together at one end by the grip portion 102 as most clearly illustrated in FIGS. 3A and 3D. Each of the arms 104A and 104B define opposing longitudinal slots 106A, 106B therethrough, which serve to receive and guide opposing legs of the ratchet pawl assembly 58 during manipulation of the ratchet pawl assembly 58 as will be described hereinafter. The handle arms 104A and 104B terminate at handle lobes 38A and 38B respectively. The grip portion 102 defines a flange 108 having a slot 110 defined therethrough.

Referring now to FIG. 3C, a magnified and partial cutaway view of the lobe portion 38A of the handle 100 is shown. The lobes 38A and 38B are configured with identical profiles, and the following discussion of the lobe 38A therefore applies directly to the lobe 38B. In any case, the lobe 38A defines three particular areas or regions of interest. One is a protrusion 120 that is defined near the bottom of the lobe 38A, another is a protrusion 124 defined near a junction of the lobe 38A with the handle arm 104A, and a third is the region 122 defined between the protrusions 120 and 124. The purpose of the protrusions 120 and 124, and of the region 122, will be described in detail hereinafter with respect to FIGS. 8-11.

Figure 3E:
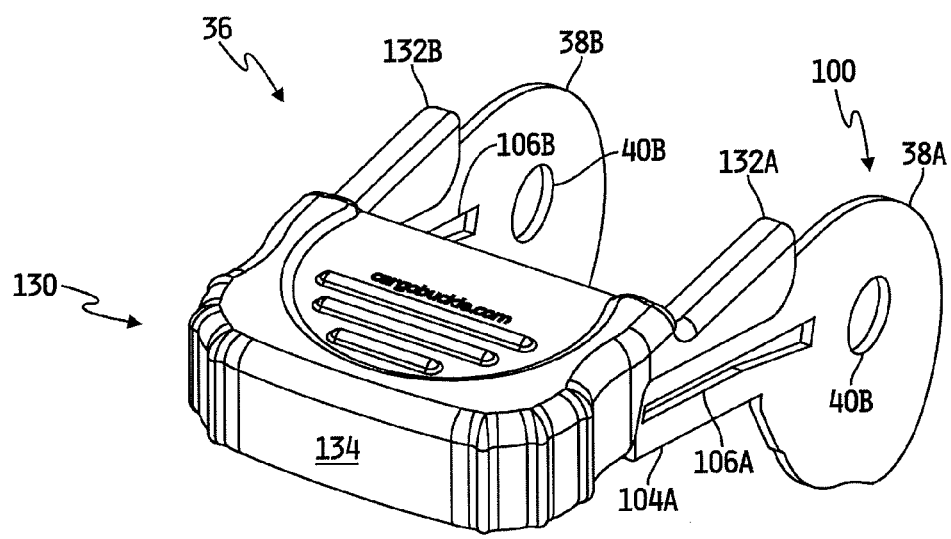
FIG. 3E is an assembled view of the handle assembly of the retractable tie down device of FIG. 1.

Referring now to FIGS. 3D and 3E, the handle boot 130 includes a grip portion 134 having a pair of arm portions 132A and 132B extending from opposite sides thereof. As illustrated in FIG. 3E, the grip portion 134 of the boot 130 is sized to be received on the grip portion 102 of the handle 100, and the arm portions 132A and 132B are configured to be received over the corresponding arms 104A and 104B of the handle 100.

Figure 4A:
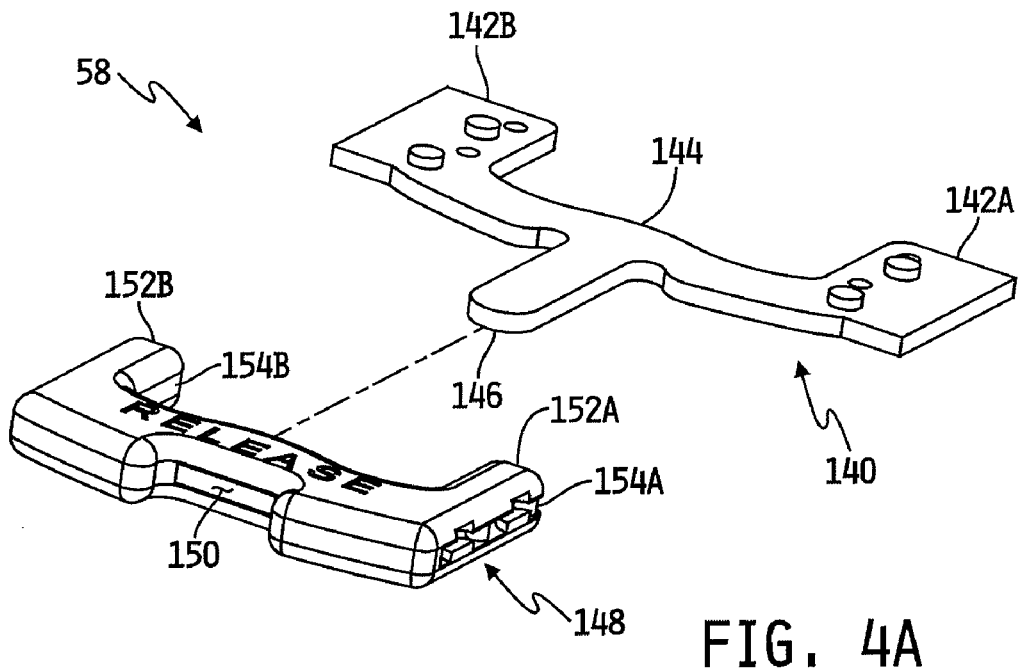
FIG. 4A is an assembly view of the ratchet pawl and ratchet pawl boot of the retractable tie down device of FIG. 1.
Figure 4B:
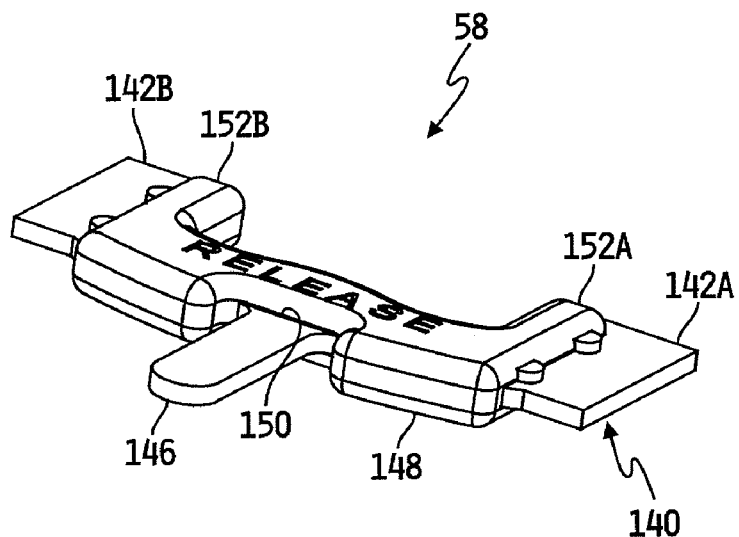
FIG. 4B is an assembled view of the ratchet pawl and ratchet pawl boot of the retractable tie down device of FIG. 1.

Referring now to FIGS. 4A and 4B, various details of the ratchet pawl assembly 58 are shown. In the illustrated embodiment, the assembly 58 includes a ratchet pawl 140 having a pair of legs 142A and 142B each having a free end and each having an opposite end that is connected together by a grip portion 144. In an opposite direction from the legs 142A and 142B, a spring guide 146 extends approximately centrally from the grip portion 144.

The ratchet pawl boot 148 includes a pair of legs 152A and 152B extending from, and connected to, opposite ends of a grip portion that extends between the legs 152A and 152B. The grip portion may include one or more pads or other attachable or integral structures that facilitate gripping or grasping of the ratchet pawl assembly 58. The gripping portion of the ratchet pawl boot 148 defines a slot 150 that is sized to receive the ratchet pawl spring guide 146 therethrough, and the legs 152A and 152B each define channels 154A and 154B respectively therethrough, which are sized to receive the ratchet pawl legs 142A and 142B therein as shown in FIG. 4B. A portion of the ratchet pawl leg 142A extends laterally away from the ratchet pawl boot leg 152A, and the ratchet pawl leg 142B likewise extends laterally away from the ratchet pawl boot leg 152B as shown in FIG. 4B. The ratchet pawl legs 142A and 142B are sized to be received within the slots 106A and 106B of the handle assembly 36 with the ratchet pawl spring guide 146 received within the slot 110 of the flange 108 of the handle grip 102 as illustrated in FIGS. 1 and 7-11. The ratchet pawl 158 is thus movably mounted to the handle assembly 36 with the ratchet pawl legs 142A and 142B positioned within the channels 106A and 106B respectively of the arms 104A and 104B of the handle assembly 36, and with the ratchet pawl spring guide 146 received within the slot 110 of the flange 108 of the handle grip 102. The spring 60 is positioned about the ratchet pawl spring guide 146 with one end abutting the ratchet pawl boot 148 and the opposite end extending through the slot 110 of the flange 108 of the handle grip 102 as most clearly shown in FIGS. 8-11. The spring 60 is configured to bias the ratchet pawl 58 away from the handle grip 102. As the spring 60 is compressed by manually forcing the ratchet pawl assembly 58 toward the handle grip 102, the ratchet pawl legs 142A and 142B travel longitudinally through the slots 106A and 106B in a direction away from the lobes 38A and 38B. When the manual force on the ratchet pawl assembly 58 is released, the ratchet pawl legs 142A and 142B travel longitudinally through the slots 106A and 106B, under the force of the spring 60, toward the lobes 38A and 38B.

Figure 5A:
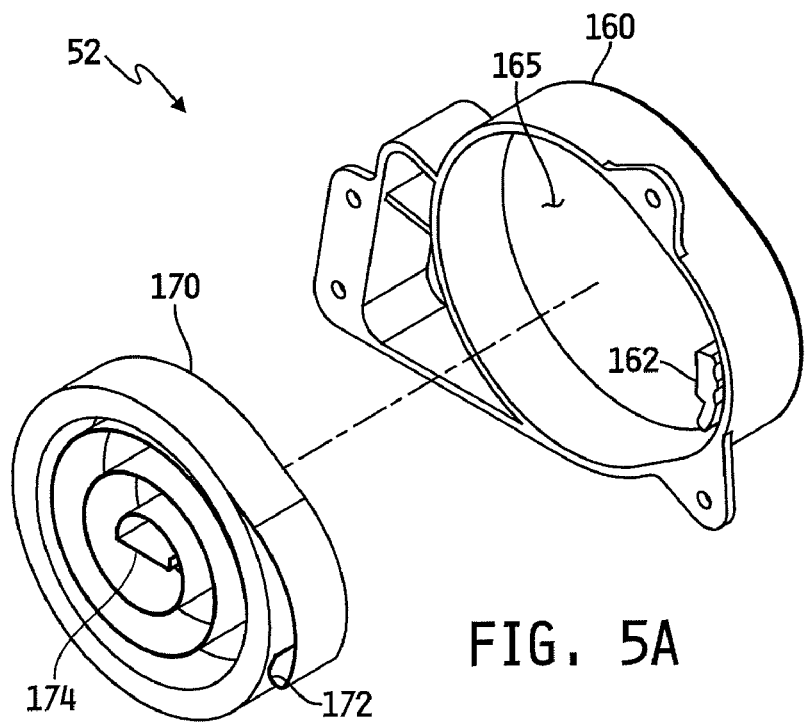
FIG. 5A is an assembly view of the power spring assembly of the retractable tie down device of FIG. 1.
Figure 5B:
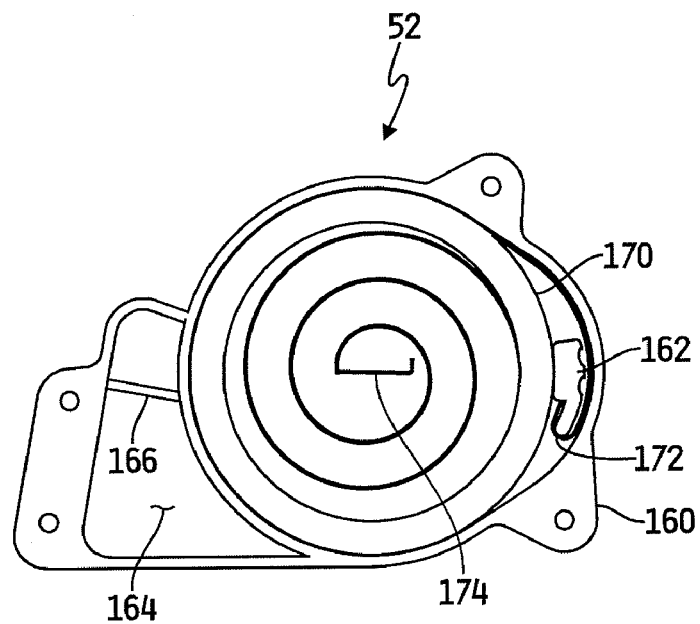
FIG. 5B is an assembled view of the power spring assembly of the retractable tie down device of FIG. 1.

Referring now to FIGS. 5A and 5B, various features of the cup 160 of the retractable tie down device 10 of FIG. 1 are shown. The cup 160 defines therein a space 165 that is sized to receive a power spring 170. In the illustrated embodiment, the power spring 170 is a flat, coiled spring that, although this disclosure contemplates that the power spring 170 may alternatively be provided in other conventional forms. The cup 160 defines a spring attachment member 162 that is sized and configured to receive one end 172 of the power spring 170. As most clearly shown in FIG. 5B, the end 172 of the power spring 170 is configured to engage, and be secured to, the spring attachment member 162. The opposite end 174 of the spring 170 is configured to be received within the slot 53 defined in the pin or axle 48 as illustrated in FIG. 1. When the spring 170 is received within the cup 160, and the cup 160 is attached to the external side of the sidewall 12B of the frame 12, the spring 170 is configured to apply a rotational bias to the pin or axle 48 such that the spool assembly 26 normally rotates in a web take-up direction to take up the web 18 on the spool assembly 26 in a conventional manner.

Figure 6A:
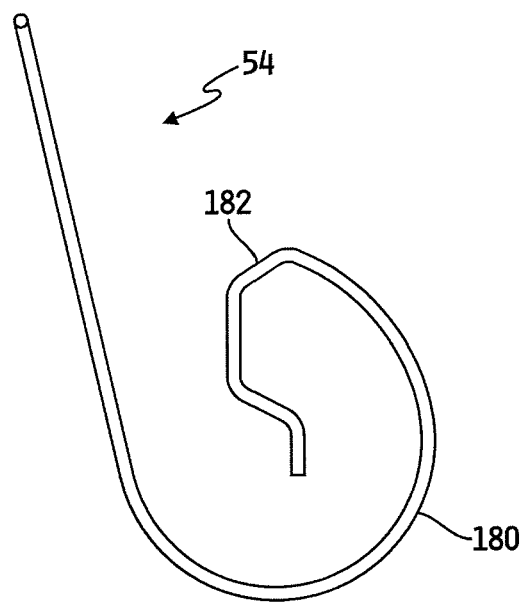
FIG. 6A is a side elevational view of the lock pawl spring of the retractable tie down device of FIG. 1.
Figure 6B:
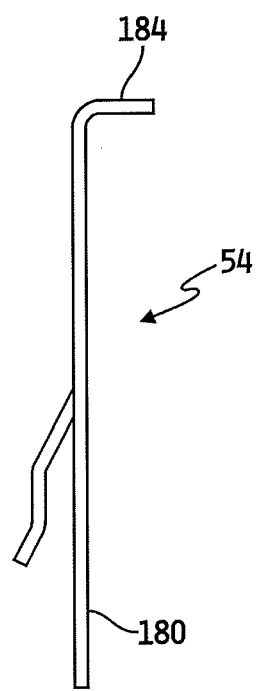
FIG. 6B is a rear elevational view of the lock pawl spring of the retractable tie down device of FIG. 1.

Referring now specifically to FIG. 5B, and also to FIGS. 6A and 6B, the cup 160 defines another space 164 that is sized and configured to receive the lock pawl spring 54 therein. The curved portion 180 of the lock pawl spring 54 is received within the space 164, and the section 182 of the lock pawl spring 54 is received within the bore 186 of the lock pawl 56 after the end of the lock pawl 56 that defines the bore 186 is received through the bore 88B defined in the sidewall 12B of the frame 12 (see FIG. 1). The opposite end 184 of the lock pawl spring 54 is received within a bore 187 defined through the sidewall 12B of the frame 12 (see FIG. 1). The lock pawl spring 54 normally biases the lock pawl 56 relative to the frame 12 such that the top longitudinal edge of the lock pawl 56, i.e., the edge facing upwardly away from the frame base 70A in FIG. 1, is biased toward the spool assembly 26. When the cup 160 is secured, e.g., via a number of fastening members, to the external side of the sidewall 12B of the frame 12, the power spring 170 and the ratchet pawl spring 54 are both completely contained within the cup 160 and are therefore generally inaccessible.

Figure 7:
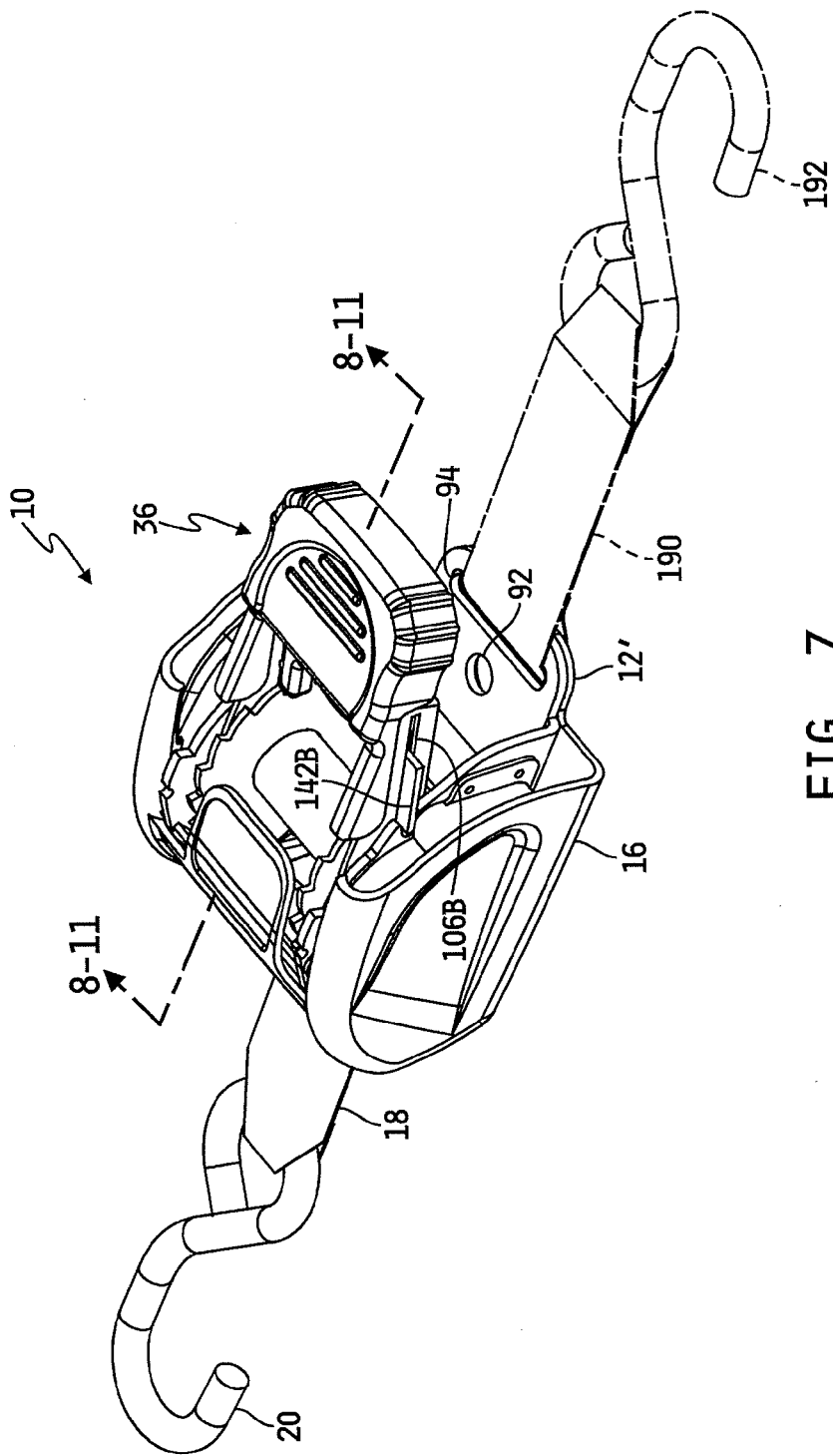
FIG. 7 is a perspective view of the assembled retractable tie down device of FIG. 1 shown with one alternate embodiment of the frame.

Referring now to FIG. 7, the retractable tie down device 10 of FIG. 1 is shown in assembled form. In the illustrated embodiment, one alternative embodiment 12' of the frame is shown. The base portion 70A of the frame 12' defines a transverse channel or slot 94 adjacent to an outer end of the base portion 70A, which is sized to receive a web, belt, strap or tether therethrough. Optionally, as shown in phantom in FIG. 7, a web 190 may be attached to the frame base 70A via the slot 94 in a conventional manner. An opposite end of the web 190 may be attached in a conventional manner to an engagement member 192, which may be provided in the form of any one or more of the engagement members 20 as described hereinabove. In this embodiment, the web 18 pays out from one end of the frame 12, and the web 190 extends from an opposite end from the frame 12, as illustrated in FIG. 7.

Referring now to FIGS. 8-11 generally, various cross-sectional views of the retractable tie down device 10 of FIG. 7 are shown, as viewed through section lines 8-11—8-11, illustrating a number of different positions and/or operational regions of the handle assembly 36 relative to the frame 12. While the following description of the operation of the retractable tie down device 10 will generally refer to details of only one leg 104A and lobe 38A of the handle assembly 36, to details of only one sidewall 12A of the frame 12 and to details of only one ratchet wheel 32A, it will be understood that the remaining leg 104B and lobe 38B of the handle assembly 36, the sidewall 12B of the frame 12 and the ratchet wheel 32B are configured identically to the described components, and that the following description therefore applies equally to the non-illustrated components.

Figure 8:
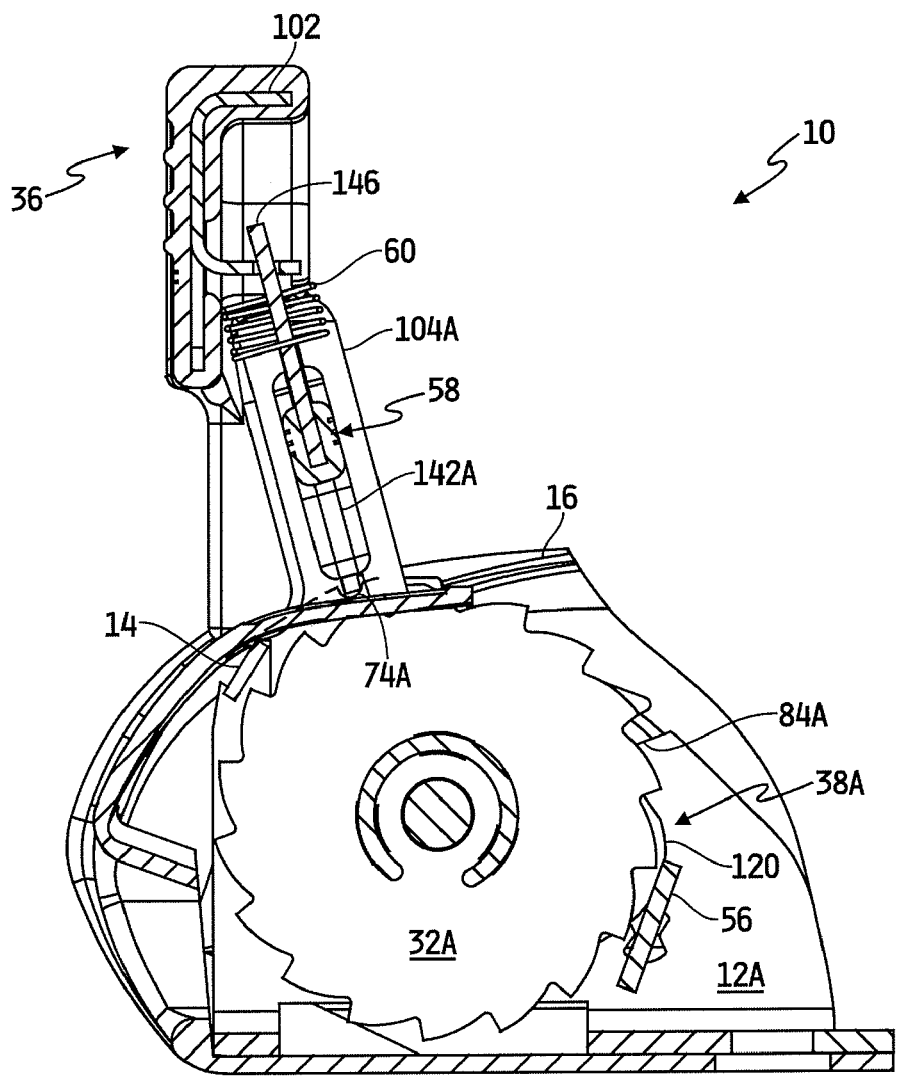
FIG. 8 is a cross-sectional view of the retractable tie down device of FIG. 7, viewed along section lines 8-11—8-11, with the handle in one web free-spooling position.

Referring specifically to FIG. 8, the handle assembly 36 is shown in a so-called free-spooling position, relative to the frame 12, wherein the web 18 may be manually drawn away from the frame 12, by applying a pulling force on the web 18 that is sufficient to overcome the bias of the power spring 170 so that the spool assembly 26 rotates in a web pay out direction, and wherein the spool assembly 26 rotates in a web take-up direction to draw the web 18 back into the frame 12, when the manual pulling force on the web 18 is released. As shown in FIG. 8, when the handle assembly 36 is in the illustrated position with the handle grip 102 extending upwardly away from the frame 12, the protrusion 120 defined on the lobe 38A pushes the lock pawl 56 away from engagement with the ratchet wheel 32A so that the lock pawl 56 does not engage or otherwise contact the ratchet wheel 32A. With the handle assembly 36 in the position shown, the ratchet pawl leg 142A is received within the channel 74A defined in the top of the sidewall 12A of the frame 12 so that the ratchet pawl 142A is maintained in a position away from, and not in contact with, the ratchet wheel 32A. Moreover, because the ratchet pawl leg 142A is trapped within the channel 74A, the handle assembly 36 is locked or secured in the position shown as a result of the force of the compressed spring 60 acting upon the ratchet pawl 140 to maintain the ratchet pawl leg 142A within the channel 74A of the sidewall 12A. In order to move the handle assembly 36 from the position shown, an upward force must be applied to the ratchet pawl assembly 58 to further compress the spring 60 and draw the ratchet pawl leg 142A away from the channel 74A.

Figure 9A:
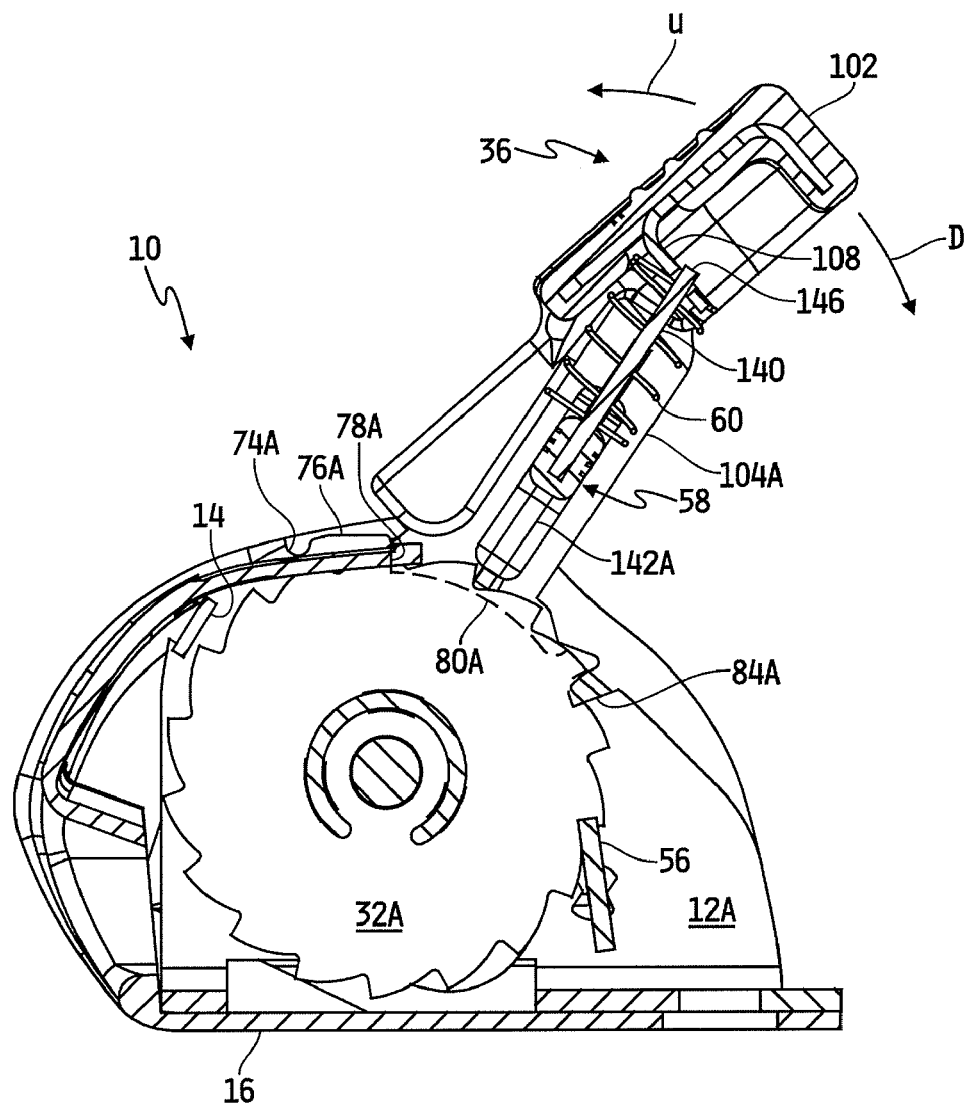
FIG. 9A is a cross-sectional view of the retractable tie down device of FIG. 7, viewed along section lines 8-11—8-11, with the handle in a web ratcheting position.
Figure 9B:
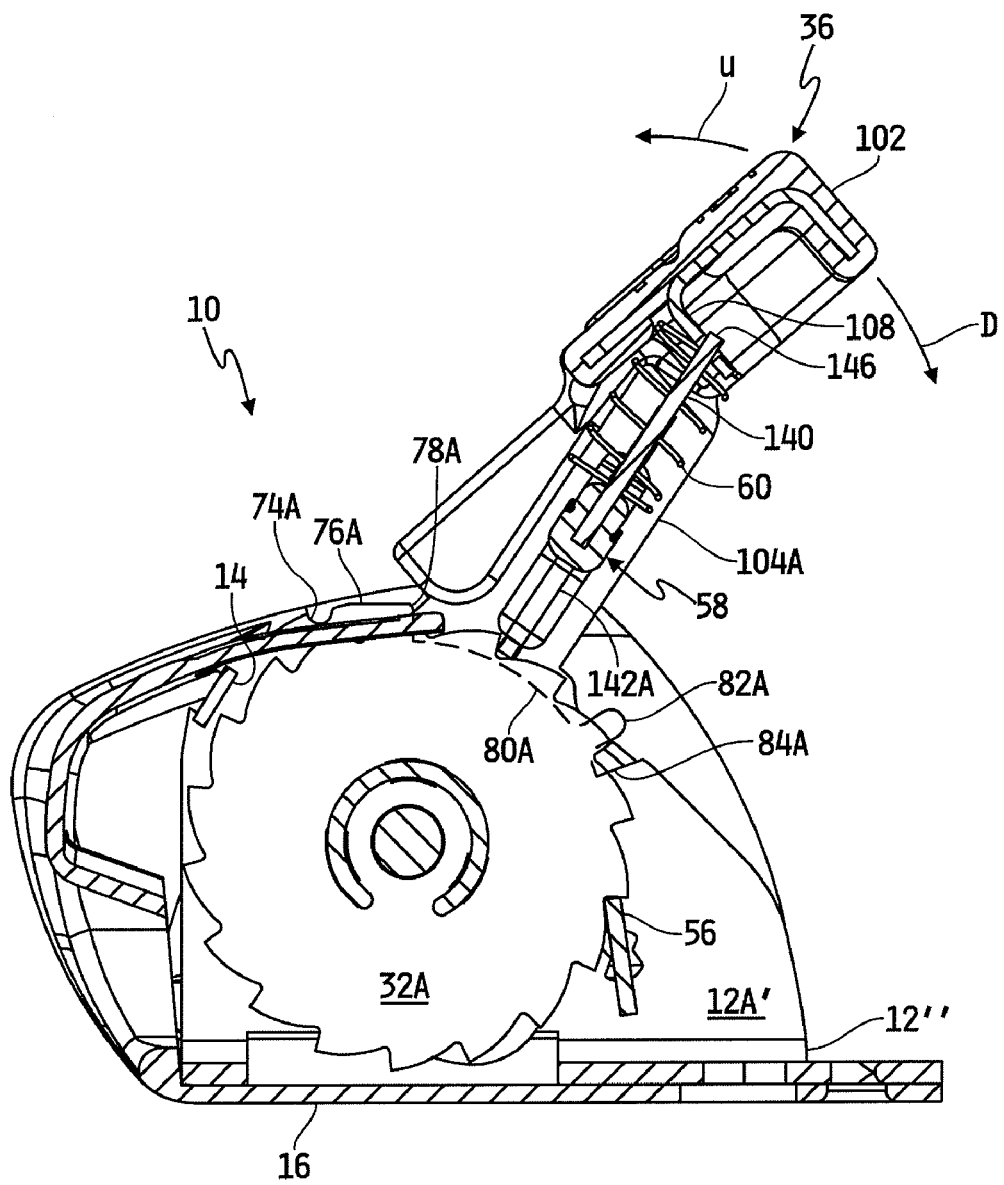
FIG. 9B is a cross-sectional view, identical to FIG. 9A, except shown with another alternate embodiment of the frame of the retractable tie down device

Referring now to FIG. 9A, the handle assembly 36 has been manipulated such that the ratchet pawl leg 142A has been drawn out of the channel 74A, and the handle assembly 36 has been moved past the generally horizontal surface 76A, and over the substantially vertical wall 78A into the web ratcheting region 80A. Generally, the ratcheting region 80A is defined at one end by the substantially vertical wall 78A, as just described, and at an opposite end by the channel 84A, as shown in FIG. 9A. When the handle assembly 36 is positioned in the web ratcheting region 80A, the region 122 of the lobe 38A (see FIG. 3C) does not contact the lock pawl 56 so that the lock pawl 56 is forced, under the bias of the lock pawl spring 54, into engagement with the ratchet wheel 32A as shown. The ratchet pawl 140 is likewise forced, under the bias of the spring 60, toward the ratchet wheel 32A such that the ratchet pawl leg 142A engages the ratchet wheel 32A when the handle assembly 36 is positioned within the web ratcheting region 80A of the frame 12. Within this region, the handle assembly 36 may be forced downwardly in the direction D to a position just above the channel 84A, and then in an upward direction as indicated by the directional arrow U, until the ratchet pawl leg 142A contacts the substantially vertical surface 78A of the frame 12. The teeth defined on the ratchet wheel 32A are oriented such that the ratchet pawl leg 142A engages the ratchet wheel 32A between adjacent teeth and forces the ratchet wheel 32A to rotate in the web take-up direction when the handle assembly 36 is moved in the upward direction U relative to the frame 12. When the handle assembly 36 is moving in the upward direction U, as just described, the lock pawl 56 is maintained in contact with the ratchet wheel 32A, under the bias of the lock pawl spring 54, but, because of the orientation of the teeth defined in the ratchet wheel 32A, the lock pawl 56 merely rides along the exterior surfaces of the teeth as the ratchet wheel 32A rotates in the web take-up direction. Conversely, when the handle assembly 36 is moved in the downward direction D, the roles of the lock pawl 56 and the ratchet pawl 142A are reversed such that the lock pawl 56 engages the ratchet wheel 32A between adjacent teeth and thereby keeps the ratchet wheel 32A from rotating in the web pay-out direction while the ratchet pawl leg 142A contacts the ratchet wheel 32A but merely rides along the exterior surfaces of the teeth defined on the ratchet wheel 32A as the handle assembly 36 is moved in a downward direction D. The alternate upward and downward motion of the handle assembly 36, as just described, allows the web 18 to be incrementally ratcheted in the web take-up position. Thus, if the engagement member 20 is secured to one location and the frame 12 is secured to a different, remote location, ratcheting of the web 18 in the manner just described results in tightening of the web 18 such that cargo may be secured between the web 18 and a support surface in a conventional manner. In an alternate embodiment, as illustrated in FIG. 9B, the frame wall 12'A of another alternative embodiment of the frame 12" may define a protrusion 82A (and the frame wall 12'B (not shown)may likewise define a protrusion 82B (not shown))adjacent to the channel 84A. In this alternate embodiment, the protrusions 82A and 82B provide a stop member at the end of the ratcheting regions 80A and 80B that physically prevent the ratchet pawl legs 142A and 142B from entering the channels 84A and 84B when the handle assembly 36 may be forced downwardly in the direction D. To move the ratchet pawl legs 142A and 142B into the channels 84A and 84B, a manual force must be applied to the ratchet pawl 140 to sufficiently compress the spring 60 so that the ratchet pawl legs 142A and 142B clear the protrusions 82A and 82B.

Figure 10:
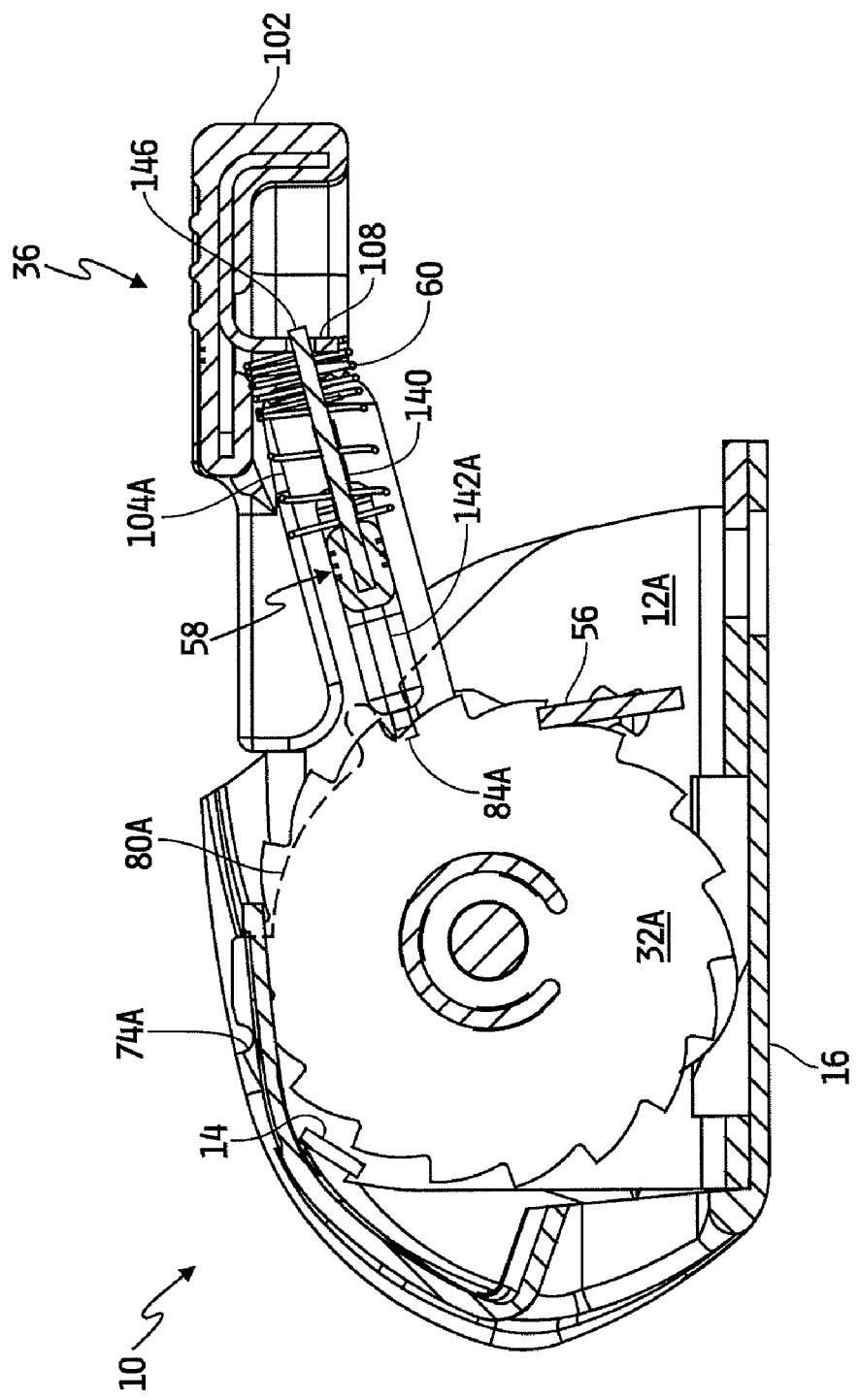
FIG. 10 is a cross-sectional view of the retractable tie down device of FIG. 7, viewed along section lines 8-11—8-11, with the handle in a web locking position.

Referring now to FIG. 10, the handle assembly 36 has been moved from the web ratcheting region 80A into the channel 84A defined in the upper surface of the sidewall 12A of the frame 12. Illustratively, this movement is accomplished without manually applying any compression to the spring 60. When the handle assembly 36 is in the position shown in FIG. 10, the region 122 of the lobe 38A does not contact the lock pawl 56 so that the lock pawl 56 is forced, under the bias of the lock pawl spring 54, into engagement with the ratchet wheel 32A, between adjacent teeth defined on the ratchet wheel 32A. The ratchet pawl leg 142A is, in the position of the handle assembly 36 shown in FIG. 10, likewise forced into engagement with the ratchet wheel 32A, between adjacent teeth formed on the ratchet wheel 32A. Because the ratchet pawl leg 142A is trapped within the channel 84A, the handle assembly 36 may not be moved from this position without manually forcing the ratchet pawl 140 against the spring 60 sufficiently to draw the ratchet pawl leg 142A out of the channel 84A. Thus, in the position shown in FIG. 10, the handle assembly 36 is in a web-locking or web-locked position in which the lock pawl 56 and the ratchet pawl leg 142A act together to keep the ratchet wheel 32A from rotating in the web pay-out direction and to keep the handle assembly 36 from rotating upwardly. In this position, the web 18 is prohibited from moving in the pay-out direction while any slack in the web 18 is taken up by the spool 26 in the web take-up direction.

Figure 11:
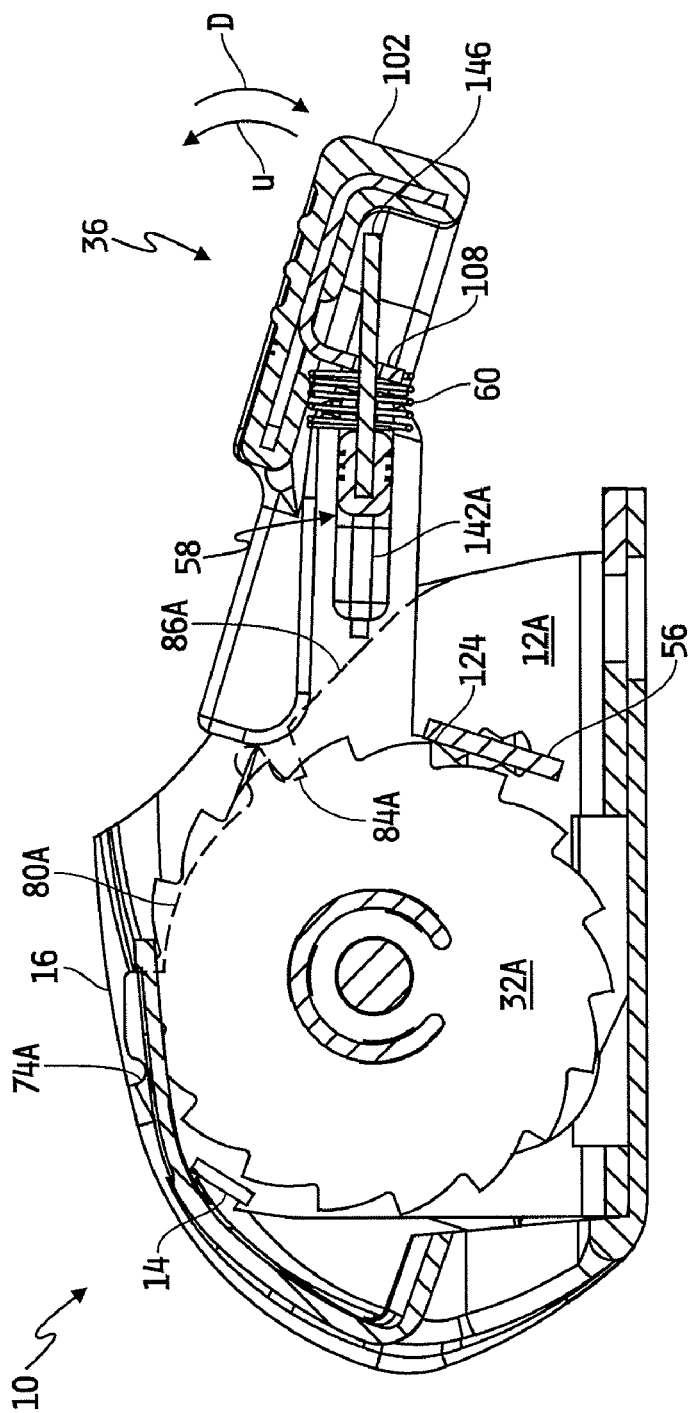
FIG. 11 is a cross-sectional view of the retractable tie down device of FIG. 7, viewed along section lines 8-11—8-11, with the handle in another web free-spooling position.

Referring now to FIG. 11, the handle assembly 36 has been moved from the web-locking position shown in FIG. 10 to another web free-spooling position. This is accomplished by applying manual force to the ratchet pawl 140 that is sufficient to overcome the bias of the spring 60 and to compress the spring 60 sufficiently to draw the ratchet pawl leg 142A out of the channel 84A. As the handle assembly 36 is manually forced in the downward direction D, the ratchet pawl leg 142A rides along the curved surface 86A of the sidewall 12A of the frame 12, and is thereby maintained away from, and out of contact with, the ratchet wheel 32A. When the handle assembly 36 is forced sufficiently downwardly in the direction D, the protrusion 124 defined on the lobe 38A of the handle 100 moves the lock pawl 56 away from, and out from engagement with, the ratchet wheel 32A as illustrated in FIG. 11. In this position, the device 10 is operable in a web freespooling mode identical to that described hereinabove with reference to FIG. 8. When the downward force applied to the handle assembly 36 is removed, the handle assembly 36 automatically moves upwardly in the direction U and returns to the web-locking position shown in FIG. 10.

In the embodiment illustrated in FIGS. 1-11, the frame boot 16, handle grip boot 130 and ratchet pawl boot 148 are made from a semi-rigid polymer material, although this disclosure contemplates fabricating these components from other conventional rigid, semi-rigid or flexible materials. The cup 52 is, in the illustrated embodiments, made from a rigid polymer material, although this disclosure contemplates fabricating the cup 52 from other rigid or semi-rigid materials capable of retaining the power spring 170 and lock pawl spring 54 therein. The bushings 42A, 42B and 46A, 46B are, in the illustrated embodiment, formed of nylon or other conventional bushing material. All other components, with the exception of the web 18, are formed of stainless steel, although this disclosure contemplates that one or more components may be formed of other suitable materials. The web 18 and the optional web 190 are illustratively formed of conventional woven fabric material, although this disclosure contemplates that the web 18 and/or web 190 may be formed of other conventional, flexible or semi-flexible web, strap, tether or belt materials. The engagement member 20 may or may not be coated with a non-abrasive coating, e.g., rubber or soft polymer.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A retractable tie down device, comprising:
   a frame,
   a spool rotatably mounted to the frame, the spool having at least one ratchet wheel mounted thereto,
   a flexible web having one end mounted to the spool,
   a power spring configured to rotate the spool in a web take-up direction,
   a handle movably mounted to the frame and movable relative to the frame between first and second positions, a ratchet pawl movably mounted to the handle and biased toward the at least one ratchet wheel, and a lock pawl movably mounted to the frame and biased relative to the frame toward the at least one ratchet wheel, wherein the handle is configured to maintain the lock pawl away from the at least one ratchet wheel, and the frame is configured to maintain the ratchet pawl away from the at least one ratchet wheel, when the handle is in each of the first and second positions so that the spool is rotatable in a web pay-out direction, opposite to the web take-up direction, whereby the web may be drawn away from the device.

2. The retractable tie down device of claim 1 the frame defines a channel configured to receive the ratchet pawl therein when the handle is in the first position so that the handle is secured to the frame in the first position.

3. The retractable tie down device of claim 1 wherein the handle defines third and fourth positions, between the first and second positions, relative to the frame, the handle being movable between the third and fourth positions to ratchet the spool in the web take-up direction.

4. The retractable tie down device of claim 3 wherein the ratchet pawl and the lock pawl both contact the at least one ratchet wheel throughout movement of the handle between the third and fourth positions, and wherein the at least one ratchet wheel defines a plurality of teeth thereon oriented to allow movement of the ratchet pawl relative to the at least one ratchet wheel, while engaging the lock pawl such that the lock pawl locks the at least one ratchet wheel to the frame, when the handle is moved from the third to the fourth position, and to engage the ratchet pawl, while allowing the lock pawl to move relative to the at least one ratchet wheel, when the handle is moved from the fourth to the third position, whereby the spool is ratcheted in the web take-up direction by moving the handle between the third and fourth positions.

5. The retractable tie down device of claim 1 wherein the handle defines a fifth position, between the first and second positions, relative to the frame, and wherein the frame defines a channel configured to receive the ratchet pawl therein when the handle is in the fifth position so that the handle is secured to the frame, and wherein the ratchet pawl and the lock pawl both engage the at least one ratchet wheel so that the spool is prohibited from rotating in the web pay-out direction when the handle is in the fifth position.

6. The retractable tie down device of claim 5 wherein the handle is movable under manual force applied thereto to the second position, and wherein the handle is configured to automatically move from the second position to the fifth position when the manual force is removed from the handle with the handle in the second position.

7. The retractable tie down device of claim 1 wherein the frame defines a first end and a second end opposite to the first end, and wherein the spool is oriented relative to the frame such that the flexible web pays out of the first end of the frame.

8. The retractable tie down device of claim 7 wherein the frame defines a hole through the frame between the first and second ends, the hole configured to receive a mounting post whereby the device is mounted to the mounting post.

9. The retractable tie down device of claim 7 wherein the frame defines a web slot through the frame adjacent to the second end of the frame, the web slot configured to receive another web, separate from the flexible web, therethrough.

10. The retractable tie down device of claim 9 further comprising the another web extending away from the second end of the frame and having one end extending through the web slot and then secured to itself such that the another web is secured to the frame.

11. The retractable tie down device of claim 10 further comprising an engagement member attached to an opposite end of the another web.

12. The retractable tie down device of claim 1 further comprising an engagement member attached to an opposite end of the flexible web.

13. A retractable tie down device, comprising:
a frame defining a channel therein,
a spool rotatably mounted to the frame, the spool having at least one ratchet wheel mounted thereto,
a flexible web having one end mounted to the spool,
a power spring configured to rotate the spool in a web take-up direction,
a handle movably mounted to the frame and movable relative to the frame,
a ratchet pawl movably mounted to the handle and biased toward the at least one ratchet wheel, and
a lock pawl movably mounted to the frame and biased relative to the frame toward the at least one ratchet wheel,
wherein the channel is configured to receive the ratchet pawl therein such that the handle is secured to the frame, and when the ratchet pawl is received within the channel the ratchet pawl and the lock pawl each engage the at least one ratchet wheel to prohibit the spool from rotating in the web pay-out direction.

14. The retractable tie down device of claim 13 wherein the frame defines a first end and a second end opposite to the first end, and wherein the spool is oriented relative to the frame such that the flexible web pays out of the first end of the frame.

15. The retractable tie down device of claim 14 wherein the frame defines a hole through the frame between the first and second ends, the hole configured to receive a mounting post whereby the device is mounted to the mounting post.

16. The retractable tie down device of claim 14 wherein the frame defines a web slot through the frame adjacent to the second end of the frame, the web slot configured to receive another web, separate from the flexible web, therethrough.

17. The retractable tie down device of claim 16 further comprising the another web extending away from the second end of the frame and having one end extending through the web slot and then secured to itself such that the another web is secured to the frame.

18. The retractable tie down device of claim 17 further comprising an engagement member attached to an opposite end of the another web.

19. The retractable tie down device of claim 13 further comprising an engagement member attached to an opposite end of the flexible web.

20. A retractable tie down device, comprising:
a frame,
a spool rotatably mounted to the frame, the spool having at least one ratchet wheel mounted thereto,
a flexible web having one end mounted to the spool,
a power spring configured to rotate the spool in a web take-up direction,
a handle movably mounted to the frame and movable relative to the frame, a ratchet pawl movably mounted to the handle and biased toward the at least one ratchet wheel, and a lock pawl movably mounted to the frame and biased relative to the frame toward the at least one ratchet wheel, wherein the handle is movable under manual force to a first position relative to the frame in which the handle maintains the lock pawl away from the at least one ratchet wheel and the frame maintains the ratchet pawl away from the at least one ratchet wheel so that the spool is rotatable in a web pay-out direction opposite to the web take-up direction, whereby the web may be drawn away from the device, and wherein the handle is configured to automatically move from the first position when the manual force is removed from the handle to a second position relative to the frame in which the ratchet pawl is received within a channel defined in the frame such that the handle is secured to the frame and in which the ratchet pawl and the lock pawl each engage the at least one ratchet wheel so that the spool is prohibited from rotating in the web pay-out direction.

21. The retractable tie down device of claim 20 wherein the handle defines third and fourth positions relative to the frame with the second position defined between the first position and each of the third and fourth positions, the handle being movable between the third and fourth positions to ratchet the spool in the web take-up direction.

22. The retractable tie down device of claim 21 wherein the ratchet pawl and the lock pawl both contact the at least one ratchet wheel throughout movement of the handle between the third and fourth positions, and wherein the at least one ratchet wheel defines a plurality of teeth thereon oriented to allow movement of the ratchet pawl relative to the at least one ratchet wheel, while engaging the lock pawl such that the lock pawl locks the at least one ratchet wheel to the frame, when the handle is moved from the third to the fourth position, and to engage the ratchet pawl, while allowing the lock pawl to move relative to the at least one ratchet wheel, when the handle is moved from the fourth to the third position, whereby the spool is ratcheted in the web take-up direction by moving the handle between the third and fourth positions.

23. The retractable tie down device of claim 20 wherein the frame defines a first end and a second end opposite to the first end, and wherein the spool is oriented relative to the frame such that the flexible web pays out of the first end of the frame.

24. The retractable tie down device of claim 23 wherein the frame defines a hole through the frame between the first and second ends, the hole configured to receive a mounting post whereby the device is mounted to the mounting post.

25. The retractable tie down device of claim 23 wherein the frame defines a web slot through the frame adjacent to the second end of the frame, the web slot configured to receive another web, separate from the flexible web, therethrough.

26. The retractable tie down device of claim 25 further comprising the another web extending away from the second end of the frame and having one end extending through the web slot and then secured to itself such that the another web is secured to the frame.

27. The retractable tie down device of claim 26 further comprising an engagement member attached to an opposite end of the another web.

28. The retractable tie down device of claim 20 further comprising an engagement member attached to an opposite end of the flexible web.

* * * * *